Sept. 10, 1968     J. F. HEIMOVICS, JR     3,400,746
PNEUMATIC EXPANSIBLE TIRE HAVING RESILIENTLY FOLDING SIDEWALLS
Filed Aug. 11, 1966     2 Sheets-Sheet 1
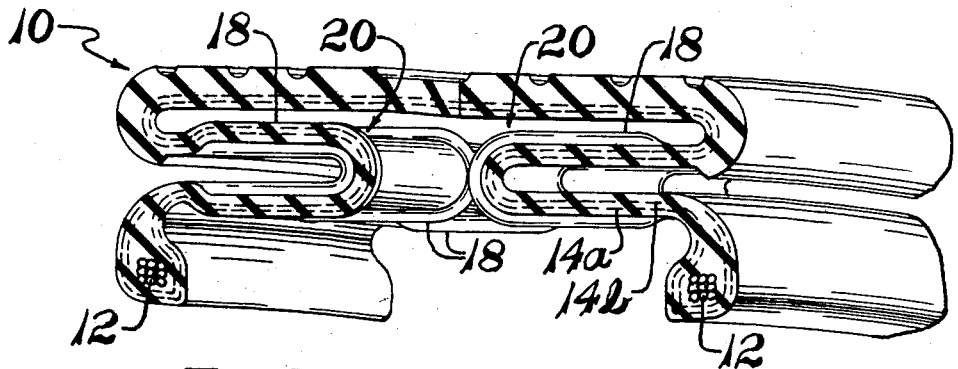
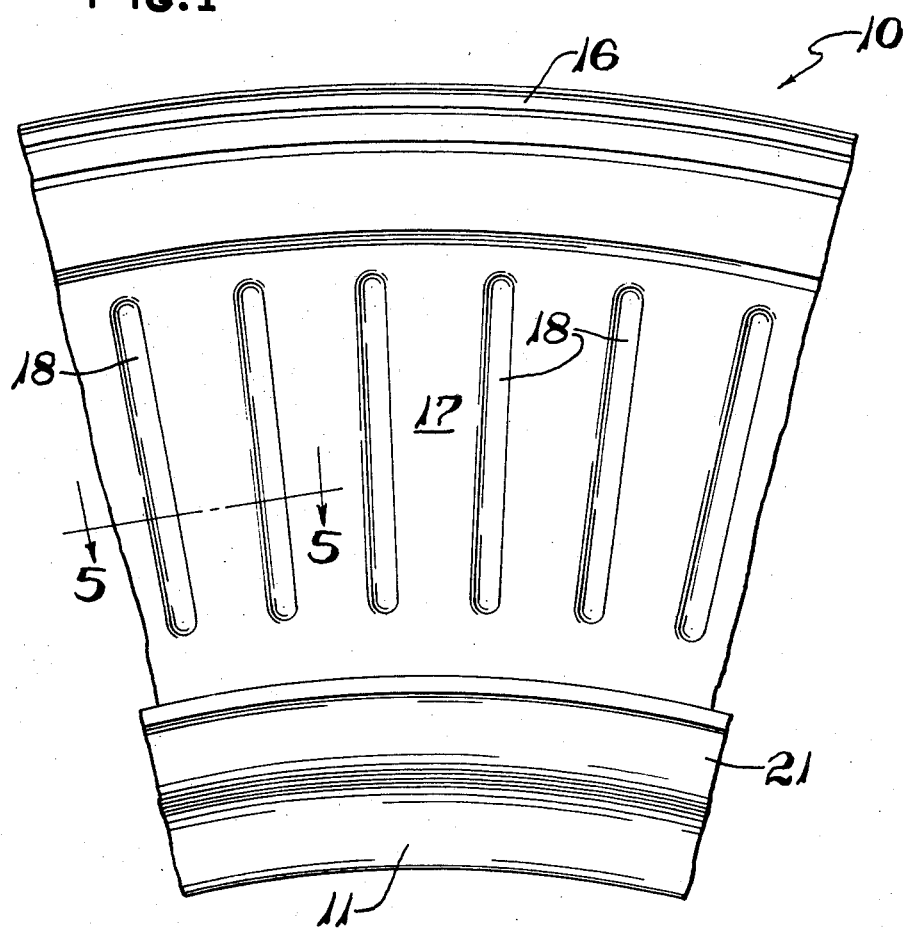
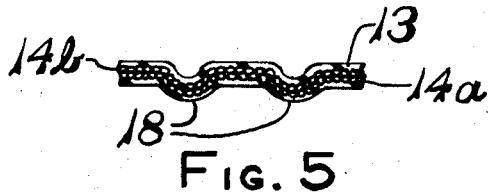
INVENTOR.
JOHN F. HEIMOVICS, JR.
BY John D. Haney
ATTY.

INVENTOR.
JOHN F. HEIMOVICS, JR.
BY John D. Haney
ATTY.

United States Patent Office 3,400,746
Patented Sept. 10, 1968

3,400,746
PNEUMATIC EXPANSIBLE TIRE HAVING RESILIENTLY FOLDING SIDEWALLS
John F. Heimovics, Jr., Stow, Ohio, assignor to The B. F. Goodrich Company, New York, N.Y., a corporation of New York
Filed Aug. 11, 1966, Ser. No. 571,930
6 Claims. (Cl. 152—330)

ABSTRACT OF THE DISCLOSURE

An expansible tire of the type which is inflatable to a generally toroidal shape and which collapses on deflation by having the tread and carcass portions elastically contract to a smaller diameter, and by having the sidewalls fold on themselves inside the tread is provided with a series of grooves or indentations molded in a radial direction across the foldable sidewalls. These grooves extend from a region near the beads to a region adjoining the tread margins, and each groove is narrow compared with its length. The grooves apparently resiliently stiffen the sidewalls thereby augmenting the refolding action during deflation of the tire.

---

This invention relates to pneumatic tires and more particularly to a structural improvement in an expansible-type pneumatic tire to insure that the tire will collapse in the proper shape. Such expansible tires look and operate when inflated much like a conventional tire, but are designed to automatically fold or collapse into a much smaller size when deflated.

The improved expansible tire of this invention is made with conventional tire-making materials and components. Structurally, the tire includes the usual pair of laterally spaced annular inextensible beads, with an interconnecting flexible annular carcass of elastomer-coated tire ply fabric, and an external ground-engaging tread capable of significant elastic expansion in circumference. The tire is molded with deep flexible folds permanently set in its sidewall regions so that each sidewall region is folded on itself axially inside the tread. So long as the tire remains deflated, the tread is circumferentially contracted (resiliently) toward the beads and the sidewall regions are folded axially inside the tread so that the external diameter and lateral width of the tire is very much smaller when deflated than when it is inflated. For example, a typical passenger car tire of this type may have its outside diameter at the crown of the tread in the order of 30% to 40% smaller when the tire is deflated than when it is inflated, and the lateral width when deflated may be about 10% smaller than when inflated. Accordingly, the total space occupied by a tire-and-wheel assembly of this type is about 50% smaller when the tire is deflated than when inflated.

These tires are normally maintained deflated in their smaller or collapsed condition on their respective service wheels, and are inflated to their larger operating size only during the periods the wheels are in actual operating or load-carrying service. During inflation, the flexible folded portion of the sidewall region is displaced so that it flexibly unfolds, and the carcass portion is elastically expanded by the inflation medium until the tire carcass approaches or assumes the characteristic open-bellied toroidal shape of a common pneumatic tire of the prior art. When fully inflated, these tires look and operate substantially like any prior art tire of corresponding size for the same service. On subsequent deflation, however, the carcass region elastically contracts to collapse the tire to its initial smaller size, with the sidewall region refolding into the original molded configuration.

According to the present invention, we have found that the proper refolding action of the sidewalls in this type tire can be greatly expedited and assured by the simple expedient of molding radial grooves into the fabric layers of the sidewall regions transverse to the folds in these regions. These grooves preferably extend radially across most of the sidewall region. They are relatively narrow compared to their length, and they are concave to the external surface of the sidewall. Preferably they are molded so that the fabric plies in the tire sidewall are indented slightly into the interior of the tire. The grooves are spaced circumferentially one from another.

The addition of such grooves transverse to the folds in the sidewall apparently tends to increase the sidewall resilience. Accordingly, when the tire is inflated to unfold the sidewalls, the portions of the sidewall containing the grooves tend to act like springs. On subsequent deflation the sidewalls containing the grooves tend to spring back to their initial folded shape more quickly than if the sidewalls did not contain such grooves.

The invention will be further explained with reference to the accompanying drawings which shows, by way of example, one preferred tire for passenger automobiles made according to and embodying this invention. In the drawings:

FIG. 1 shows a cross section in partial perspective of a tire of preferred design in the shape in which the tire is molded;

FIG. 4 shows a partial side elevation of the inflated tire; and

FIG. 5 shows a cross section through one of the sidewall grooves, along line 5—5 of FIG. 4.

Figure 2:
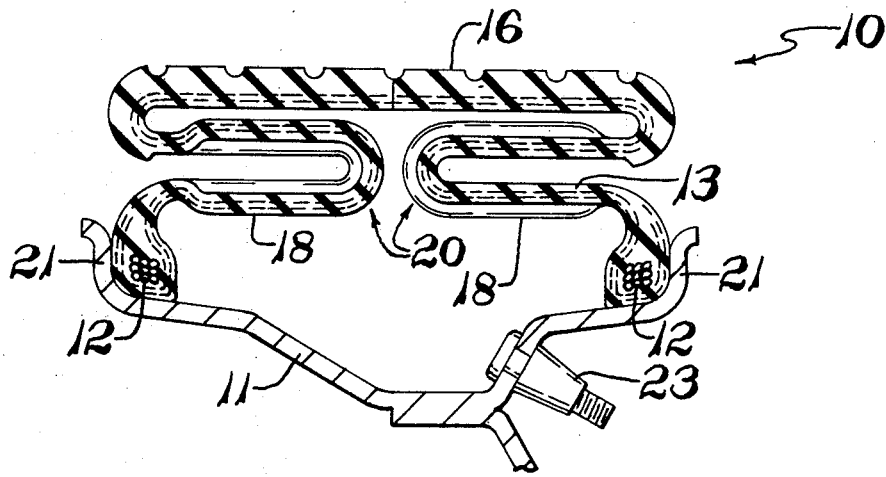
FIG. 2 shows a cross section through a tire-and-wheel rim assembly with the tire of FIG. 1 mounted but collapsed and folded.

Referring to the drawings, the tire 10 in FIG. 2 is mounted on a standard drop-center type automotive rim 11. Structurally, the tire 10 has a pair of annular laterally spaced inextensible beads 12 with a flexible carcass 13 extending between and fastened to each of the beads. The carcass 13 includes two main load-carrying fabric plies 14a, and 14b which extend continuously from one bead 12 to the other in the conventional manner in which tire plies are built into an ordinary pneumatic tire. The tire further includes a conventional type tread portion 16, the carcass plies forming sidewalls 17 extending between the shoulders or margins of the tread and the beads.

In this preferred construction, each sidewall 17 includes a series of grooves 18 (see FIG. 4) which are convex to the external surface of the sidewall and extend radially across the sidewall. These grooves are preferably molded into the sidewall when the tire is vulcanized. The grooves are preferably deep enough that they indent the fabric plies into the inside of the tire substantially as shown in FIG. 5. The grooves are narrow compared to their length, and they are uniformly spaced apart circumferentially around the sidewall.

The beads 12 are preferably wire-wound grommets and the plies 14 are fastened to the beads all in accordance with common industry practice for building passenger car tires. The plies 14 are preferably conventional tire cord fabrics (wefted or weftless) such as nylon, rayon, or special polyester cords. The elastomeric coatings on the fabrics are likewise conventional tire-making rubber compounds, as is the tread region 16.

This tire may be built on conventional passenger tire production machinery. That is to say, the green carcass of the tire may be built in cylindrical form according to the so-called flat band tire-making method. The tire cord material from which the plies 14 are made is initially coated with an elastomer and then bias cut and laid with the cord angle of successive plies opposing each other. The resulting cylindrical green tire carcass is then axially compressed into a special mold (not shown) which has a molding surface contour for imparting to the tire a permanent molded configuration substantially as shown in FIG. 1.

For passenger car service this type tire is preferably molded with a generally "flat" or cylindrical tread portion 16. Each sidewall region 17 is molded so that it has a permanent flexible hairpin-shaped fold 20 extending circumferentially around the tire. That is to say, each sidewall region 17 comprising the load-carrying plies 14 is folded on itself during the molding operation so that in the deflated condition of the tire, most of the sidewall region between the bead and the tread shoulder extends axially inward and is generally concentric with the tread region 16. The folded regions 20 define in the deflated condition an annular reentrant channel open to the exposed or outside surface of the tire.

The groove 18 are molded into the folded portions of the sidewalls concurrently with the shaping and vulcanizing of the entire tire.

The beads 12 of the tire are preferably molded so that they form an interference fit with the adjoining bead seat regions of the wheel rim along the internal surface of the rim flanges 21.

The tire preferably further includes the usual materials and features to enable the tire to operate satisfactorily in tubeless condition. The tire may be inflated or deflated by a standard rim-mounted inflation valve 23.

After the tire is initially mounted on its rim 11, preferably it is inflated just enough to wedge the beads 12 tightly against the respective bead seats of the rim. Thereafter with the tire fully deflated, the beads normally tend to remain snugly seated in the bead seats in the manner shown. To assist in maintaining the beads properly seated after a mounted tire is deflated, the tire is preferably molded with the beads 12 spaced laterally a slightly greater distance than the actual distance between the inside surfaces of the rim flanges 21.

Figure 3:
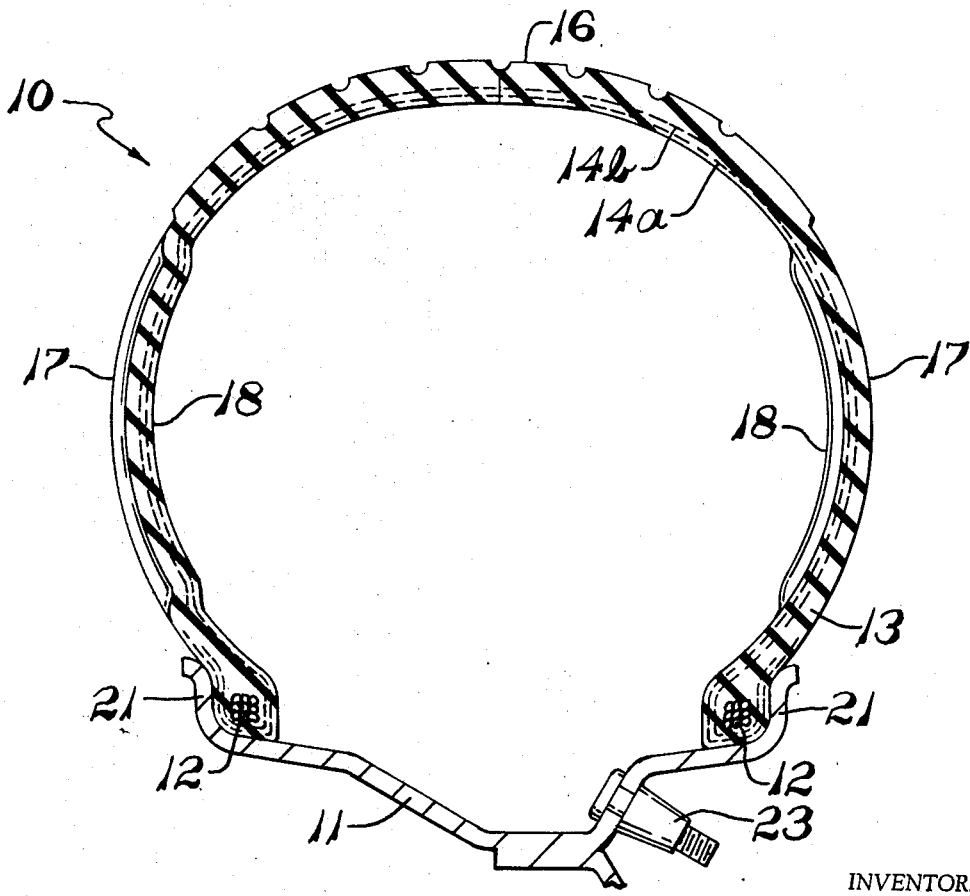
FIG. 3 shows a cross section like FIG. 1 except that the tire is inflated.

To place the resulting tire-and-rim assembly in load-carrying service, any suitable inflation mechanism may be used to introduce an inflating medium through valve 23 into the chamber defined by the interior surface of the tire and the rim 11. For passenger cars a pressure bottle of compressed air or carbon dioxide may be used for quick, convenient inflation. Progressive inflation of the tire stretches the carcass circumferentially in the tread region 16 and progressively unfolds the sidewall regions 17. The apices of the folds, indicated by numerals 20, are displaced laterally away from each other until the tire aproaches or assumes approximately the generally toroidal shape indicated in FIG. 3. When fully inflated the tire functions like any other tire of the same class and size. For emergency use in passenger cars, this improved tire may have a significantly thinner tread than would ordinarily be used with a conventional passenger car tire. The thinner tread emergency tire would be operated in load-carrying service only for a period sufficient to enable the main wheel tire to be repaired. By an apropriate selection of the tread dimensions and tread and carcass materials, however, the mileage available for a tire of this class may be varied significantly.

On release of inflation, the elasticity of the carcass portion, including particularly the tread region of the carcass and the groove-stiffened sidewalls causes the carcass to return or retract to substantially its original molded shape. During the retraction each sidewall 17 automatically refolds to the position shown in FIG. 2.

Owing to the presence of the grooves 18, the sidewalls 17 are stiffer and more resilient than they would otherwise be without such grooves. Accordingly the stiffened sidewalls 17 act like springs which are loaded or deflected when the inflating medium unfolds the sidewalls into the FIG. 3 configuration. Then when the tire is subsequently deflated, these groove-stiffened sidewalls have a very strong tendency to spring back to the folded position in which they were initially molded. Of course, a similar action occurs even without the presence of the stiffening grooves, but the presence of the latter greatly augments the spring back characteristics of the sidewalls and thereby insures that the sidewalls will refold properly before the tread region circumferentially contracts.

The grooves 18 extend transversely across the apices of the folds 20. The exact length, width, and depth of the grooves, their number and spacing are not critical in achieving the desired results. Nevertheless, the grooves operate more efficiently if many small narrow grooves are used as compared to only a few wide grooves. Also longer grooves are preferred to shorter ones, and deeper grooves are preferred to more shallow ones.

The carcass portion of this tire is capable of accommodating the unusually great circumferential elongation of the tread region between the deflated and inflated condition by a combination of the elasticity of the elastomer matrix in which the tire cord fabric is molded and by the pantographing action of the tire cords in the load-carrying plies 14. A typical type passenger car tire made according to this invention may be built up by wrapping elastomeric coated plies of tire cord 14 on a cylindrical building drum with the cords forming an angle to the circumference of the building drum of about 60 to 65°, for example. At the conclusion of the building stage, the resulting cylindrical green tire casing is then axially compressed and molded substantially to the shape shown in the solid lines in the drawing as explained in the foregoing. The steps of shaping the green carcass and molding it may shift the original cord angle to about 55–60° to the circumference (or the medial center plane) of the tread. This relatively small shift or "pantographing" of the cords during the molding results from the relatively low profile of the tire and it is very much less than the corresponding action of the cords which normally occurs where a similarly built tire is cured in the familiar toroidal form.

A much greater pantographing or cord angle shift occurs, however, in this type tire during its inflation after it is fully cured. The angle of the cords of the plies 14 and 15 of the tire noted in this example may shift from about 55–60° when the cured tire is in deflated condition, to about 35–45° when the tire is fully inflated. In each case the angle noted is measured from the medial circumference or medial center line of the tire tread. The elastic character of the elastomer matrix in which the cords are molded permits such a radical pantographing action of the cords between the inflated and deflated condition. The tire cords themselves in this tire are not intended to and do not themselves appreciably elongate during the elastic expansion of the tire carcass as it is inflated. The remarks in the foregoing description about the expansion of the tire carcass are intended to refer to an expansion involving a shifting or pantographing action of the tire cords. A tire carcass does not stretch uniformly in all directions when inflated like a homogeneous wall pressure vessel such as a simple balloon.

The foregoing angular ranges have been cited merely to illustrate the order of magnitude of the changes in cord angle which occurs in one specific size passenger car tire from the time the carcass plies are laid up on the cylindrical building drum to the time the tire is fully inflated. The actual selection of cord angles in making these tires will follow conventional practice and will depend primarily on the ultimate shape desired for the tire cross section after it is fully inflated and also on the intended service for the tire. In aircraft tires, for example, the cord angles of the several plies may undergo even greater proportional change than those described in the foregoing example.

The cord angle shifting effect which occurs in this type tire also occurs in other common pneumatic tires. There is a much greater shift in this type tire, however, during its inflation than ordinarily would occur in common tires.

The folds in the sidewall regions 17 of the illustrated tire are in substantial axial alignment with each other. Each extends almost to the medial circumferential center line of the tread region 16. The axial depth of each fold 20 may be varied depending on the size and shape desired for the inflated configuration of the tire. If the folds are more shallow than those illustrated, the radial width of the inflated tire would be correspondingly reduced. On the other hand, the radial width of the tire in its inflated condition may be significantly increased by forming the folds 20 of deeper or greater axial extent than those shown and making the folds so that one concentrically overlaps the other.

For aircraft, truck or other heavy-duty service, a tire according to this invention may be made with a great many more plies than the two shown in the drawing, and ordinarily such tires would have a much thicker tread region. Such tires may additionally include other special structural details such as fabric reinforcements of the tread. In any case, however, such tires may be made with at least one permanent inwardly folded region in the sidewall portion of the carcass in which there are a series of grooves 18 to augment the stiffness and therefore the resilience of the sidewalls in accordance with the principles of this invention.

I claim:

1. An inflatable pneumatic tire comprising a pair of laterally spaced annular beads and an annular flexible carcass of load-carrying elastomer-coated fabric plies with a circumferential tread region, and opposing sidewall regions between said tread region and each bead, at least one sidewall region having a flexible fold permanently set in the sidewall region, the fold extending circumferentially of the carcass in a continuous reentrant channel open to the outside surface of the sidewall in the deflated condition of the tire and adapted to unfold to enable the tire to assume a more nearly toroidal shape when the tire is inflated, and a series of grooves in the sidewall containing said fold for rendering said sidewall more resilient toward its folded position.

2. A tire according to claim 1 wherein said grooves are disposed radially of the sidewall.

3. A tire according to claim 2 wherein said grooves are open to the external side of the tire and indent the carcass fabric in the grooves into the interior of the tire.

4. A tire according to claim 2 wherein said grooves traverse the apex of the sidewall fold.

5. A tire according to claim 2 wherein each of said grooves is much narrower than its length and extends from a location near the bead to a location near the tread shoulder on said sidewall.

6. A pneumatic tire of the type which is inflatable to a generally toroidal shape and which comprises a pair of laterally spaced annular beads and an annular flexible elastically distensible carcass of load-carrying elastomer-coated fabric plies with a circumferential tread region and opposing flexible sidewall regions between said tread region and each bead, at least one sidewall region having a flexible fold permanently set in the sidewall region, the fold extending circumferentially of the carcass in a continuous reentrant channel open to the outside surface of the sidewall in the deflated condition of the tire with the apex of the sidewall fold having a diameter about the same size as the bead diameter, said carcass being adapted to distend and said sidewall being adapted to unfold to assume a generally toroidal shape when the tire is inflated, and characterized in that said folded sidewall includes a series of grooves transverse to the apex of the fold in said sidewall for augmenting the refolding action of such sidewall during deflation.

References Cited

UNITED STATES PATENTS

| | | | |
|---|---|---|---|
| 2,751,959 | 6/1956 | Blomquist | 152—352 |
| 3,052,429 | 9/1962 | Simon | 152—330 |
| 3,116,778 | 1/1964 | Herzegh | 152—330 |
| 3,347,301 | 10/1967 | Sidles | 152—352 |

ARTHUR L. LA POINT, *Primary Examiner.*

C. B. LYON, *Assistant Examiner.*